United States Patent
Gagnon et al.

(10) Patent No.: US 9,912,210 B2
(45) Date of Patent: Mar. 6, 2018

(54) ALTERNATOR WITH EXTERNAL COOLING SYSTEM

(71) Applicant: Ford Global Technologies, LLC, Dearborn, MI (US)

(72) Inventors: Nancy Gagnon, Ann Arbor, MI (US); Vince Paul Solferino, Dearborn, MI (US); William Taylor, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 339 days.

(21) Appl. No.: 14/452,522

(22) Filed: Aug. 5, 2014

(65) Prior Publication Data
US 2016/0043612 A1    Feb. 11, 2016

(51) Int. Cl.
*H02K 9/04*    (2006.01)
*H02K 5/20*    (2006.01)

(52) U.S. Cl.
CPC ............... *H02K 9/04* (2013.01); *H02K 5/20* (2013.01)

(58) Field of Classification Search
CPC .. H02K 9/04; H02K 9/02; H02K 9/06; H02K 5/20
USPC ...................................... 310/52–65
See application file for complete search history.

(56) References Cited

U.S. PATENT DOCUMENTS

| | | | |
|---|---|---|---|
| 7,969,051 B2 | 6/2011 | Vasilescu et al. | |
| 2008/0030084 A1* | 2/2008 | Tsuge | H02K 5/20 310/52 |
| 2010/0283336 A1* | 11/2010 | Vasilesco | H02K 9/04 310/62 |
| 2011/0101803 A1* | 5/2011 | Hayashi | H02K 5/20 310/62 |
| 2012/0019084 A1* | 1/2012 | Tsuge | H02K 5/20 310/59 |
| 2013/0234541 A1* | 9/2013 | Oleson | H02K 9/14 310/54 |

FOREIGN PATENT DOCUMENTS

| | | |
|---|---|---|
| FR | 2703852 A1 | 5/1995 |
| JP | H03270659 A | 12/1991 |
| JP | H05219685 A | 8/1993 |
| JP | 2007092545 A | 4/2007 |

* cited by examiner

*Primary Examiner* — Michael Andrews
(74) *Attorney, Agent, or Firm* — James P. Muraff; Neal, Gerber & Eisenberg LLP (57) ABSTRACT

Systems and methods are provided for cooling an alternator using a fan that is operationally independent of the alternator and a duct system that at least partially surrounds the alternator. Example vehicles include an alternator cooling system that comprises a fan configured to be operationally independent of the alternator and disposed adjacent to an end of the alternator, and a duct system encasing the end of the alternator. The vehicles further include a control module configured to control operation of the fan based on one or more inputs related to operation of the alternator. Example methods include receiving, at a processor, an input related to operation of the alternator; determining, based on the input, that a preset condition has been met, using the processor; and responsive thereto, generating a control signal to adjust an operating speed of the fan.

8 Claims, 7 Drawing Sheets

ALTERNATOR WITH EXTERNAL COOLING SYSTEM

TECHNICAL FIELD

This application generally relates to alternators in vehicles and more specifically, to cooling systems for such alternators.

BACKGROUND

Figure 1:
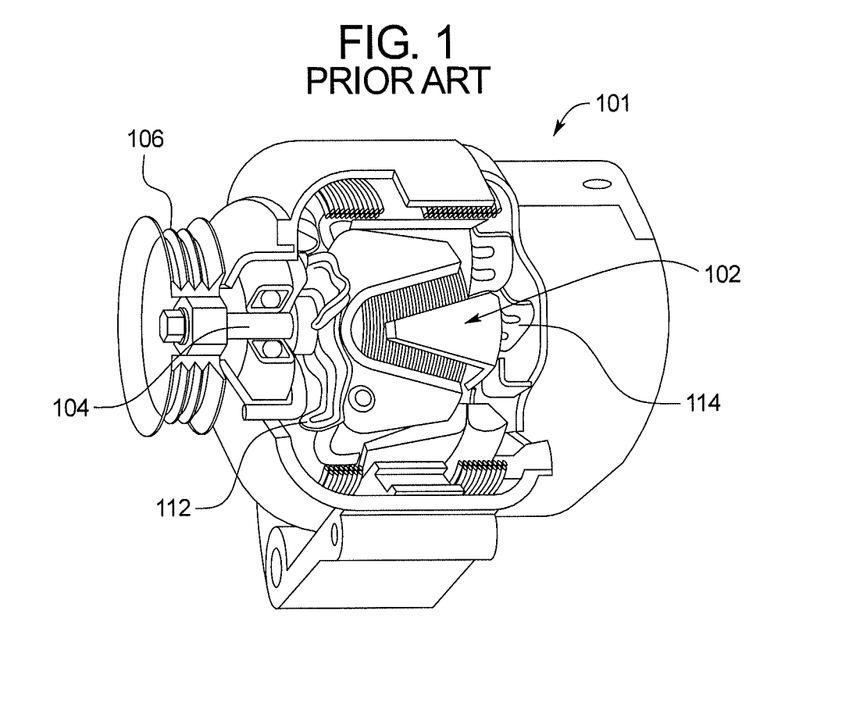
FIG. 1 depicts a conventional alternator with an internal cooling system.

Commercially-available vehicles comprise a rotating electrical machine, or an alternator, with an internal ventilation or cooling system for passing air through the alternator. FIG. 1 illustrates one example of an existing alternator 101 comprising a rotor 102 and a shaft 104 extending through the center of the rotor 102, which is annular in shape. A front axial end of the shaft 104 is coupled to a drive pulley 106 that transfers movement from a vehicle engine (not shown) to the alternator 101. The alternator 101 further includes an internal cooling system comprising a front fan 112 axially coupled to the shaft 104 at a front end of the rotor 102, and a rear fan 114 axially coupled to the shaft 104 at a rear end of the rotor 102.

Because the shaft 104 is directly coupled to both fans 112 and 114 and to the rotor 102, rotation of the shaft 104 causes a corresponding rotation of the rotor 102 and both of the fans 112 and 114. As a result, the fans 112 and 114 rotate at the same speed as the alternator shaft 104. Moreover, because the shaft 104 of the alternator 101 is driven by the vehicle engine (via the drive pulley 106), the fan speeds are also related to the engine speed. For example, when the engine is idle, the fans 112 and 114 operate at their lowest operation speed (e.g., 1625 rpm). And when the engine speed is high (e.g., 5000 rpm), the fans 112 and 114 are operating at high operation speeds (e.g., 12,500 rpm) as well (for example, as shown by curve B in FIG. 11).

When the alternator fans operate at high speeds, the airflow produced by the fans can become excessive and generate significant radiated noise, resulting in a Noise, Vibration, and Harshness (NVH) penalty. At the same time, alternators have been increasing in size to support increasing vehicular electrical loads, and as a by-product, the internal heat loads for alternators have also increased. Thus, today's alternators require larger fans to provide adequate cooling, but also need to operate at very high speeds to accommodate the higher electrical loads.

SUMMARY

This application is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

One example embodiment provides an alternator assembly comprising an alternator having a first end and an opposite end, and a cooling system configured to promote airflow between the first end and the opposite end. The cooling system includes a fan disposed adjacent to the first end and configured to operate independent of the alternator, and a duct system encasing the first end.

Another example embodiment provides a vehicle comprising an alternator and an alternator cooling system. The alternator cooling system includes a fan configured to be operationally independent of the alternator and disposed adjacent to an end of the alternator, and a duct system encasing the end of the alternator. The vehicle further includes a control module configured to control operation of the fan based on one or more inputs related to operation of the alternator.

Still another example embodiment provides a method of controlling cooling of an alternator by a fan operationally independent of the alternator and a duct system at least partially surrounding the alternator. The method includes receiving, at a processor, an input related to operation of the alternator; determining, based on the input, that a preset condition has been met, using the processor; and responsive thereto, generating a control signal to adjust an operating speed of the fan.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Figure 2:
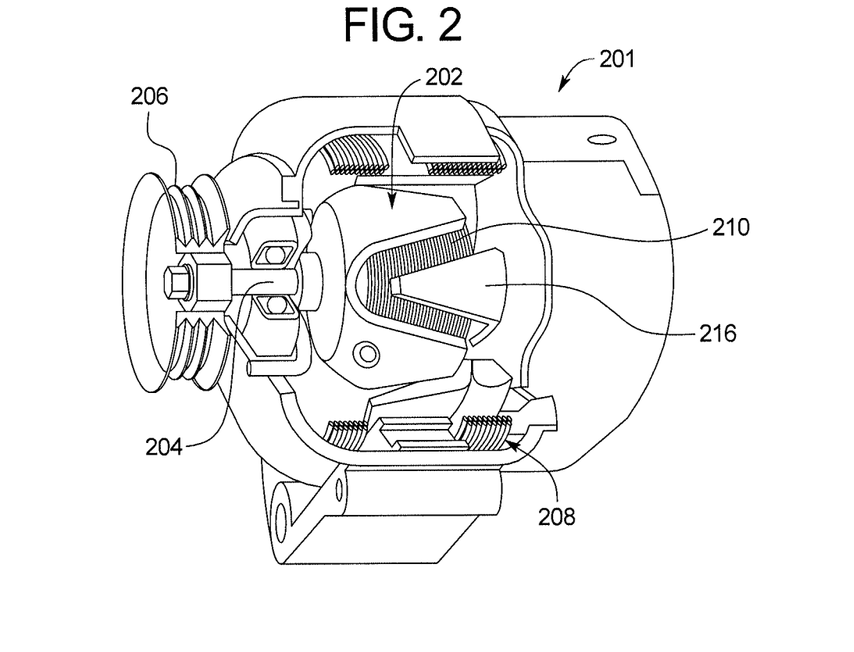
FIG. 2 depicts an example alternator coupled to an external fan, according to embodiments.

FIG. 2 depicts an exemplary alternator 201 for generating power for the electrical components of a vehicle (not shown), according to embodiments. In embodiments, the alternator 201 may be used in any of a number of vehicles, and the exact size or model of the alternator 201 may vary depending on the type of vehicle. However, the components of the alternator 201 remain the same in each case. As shown in FIG. 2, the alternator 201 includes an annular rotor 202, a shaft 204 axially coupled to the rotor 202, and a gear or drive pulley 206 coupled to a front axial end of the shaft 204. When the vehicle engine (not shown) is running, the drive pulley 206 translates rotational movement from a crankshaft (not shown) of the vehicle engine to the shaft 204, which causes the rotor 202 to rotate. As is conventional, the drive pulley 206 may be driven by a belt (not shown) coupled to the vehicle engine, and a turning speed of the shaft 204 is a multiple of the engine speed controlled by a pulley ratio. For example, the shaft speed may be 2.5 to 3 times the engine speed.

The alternator 201 generates alternating current (AC) power through electromagnetism formed by a relationship between the rotor 202 and a stator 208 included in the alternator 201. The stator 208 is comprised of stationary windings, or wire coils, that surround a fixed iron core. The rotor 202 is disposed inside the stator 208 with enough room or tolerance therebetween, so that the rotor 202 can spin at high speeds without touching the walls of the stator 208. The rotor 202 includes an inductive winding 210 that is also annular in shape and comprised of copper wire, or other suitable material. The rotor 202 further includes triangular finger poles 216 that are staggered so that the north and south poles alternate as they surround the winding 210. As the engine turns, the rotor 202, along with the winding 210, spins inside the stator 208, and the alternating pattern of the finger poles 216 creates a magnetic field that in turn induces voltage into the stator 208. The alternator 201 further includes a voltage regulator (not shown), which controls the electric current flowing in the winding 210, and thereby, regulates the voltage provided to a vehicle battery (not shown) coupled to the alternator 201.

Figure 3:
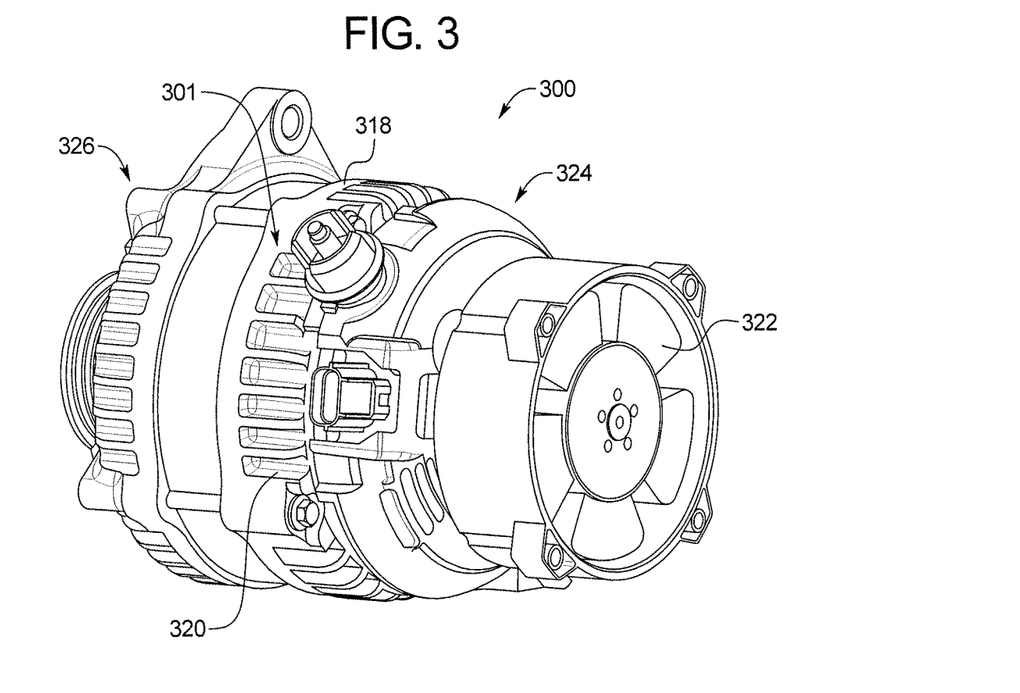
FIG. 3 depicts an example alternator system comprising an alternator and an external fan according to embodiments.

According to embodiments, the alternator 201 may be operationally similar to the conventional alternator 201, except that the alternator 201 does not include an internal cooling system or fans. That is, the internal fans 112 and 114 that are directly attached to the shaft 104 of the conventional alternator 101 have been removed from the alternator 201, as shown in FIG. 2. Instead, according to embodiments, an external fan (e.g., as shown in FIG. 3) that is mechanically and/or operationally independent of the alternator 201 may be provided for introducing cooling airflow into the alternator 201, as discussed below in more detail. Moreover, according to embodiments, the external fan can be configured to operate at a constant operating speed that is independent of the engine speed or shaft speed. As discussed below with respect to FIG. 11, by keeping the fan operating speed constant, the loudness of the alternator 201 can also remain constant, thereby eliminating noise penalty issues.

Referring now to FIG. 3, shown is an example alternator system 300 comprising an alternator casing 318 for housing an alternator 301 according to embodiments. The alternator 301 may be substantially similar to the alternator 201 depicted in FIG. 2 and discussed above. As will be appreciated, cooling is essential to the efficiency of the alternator 301. Accordingly, the alternator casing 318 may include a number of vents 320 for aiding in heat dissipation. Further, the alternator system 300 includes an external fan 322 that is mounted to, and directed towards, a back end 324 of the alternator casing 318. Placement of the external fan 322 at the back end 324 may be advantageous because the back end 324 of the alternator 301 generates a majority of the heat (e.g., about 80%) dissipated by the alternator 301. The external fan 322 may be any suitable type of fan capable of providing sufficient airflow for cooling the alternator 301 within the alternator casing 318. For example, the external fan 322 may be selected to be large enough to provide adequate cooling at high alternator operating speeds and/or at high alternator temperatures. In embodiments, the external fan 322 is a variable speed fan that is capable of being set to different operating speeds. In some embodiments, the external fan 322 is similar to an existing fan used to cool drive-line components within the vehicle.

In some embodiments, the external fan 322 operates to push cooling airflow towards the alternator casing 318, the airflow passing through the vents 320 and over the alternator. In other embodiments, the external fan 322 operates to pull hot air from the alternator casing 318, the hot air coming from the alternator through the vents 320. In some cases, the push or pull operation of the external fan 322 is determined by whether the fan 322 is placed rearward facing or forward facing relative to the back end 324 of the casing 318. In other embodiments, the external fan 322 may be configured to allow selection of the push or pull operation by including a mechanism for changing a rotational direction of the fan blades.

Figure 4:
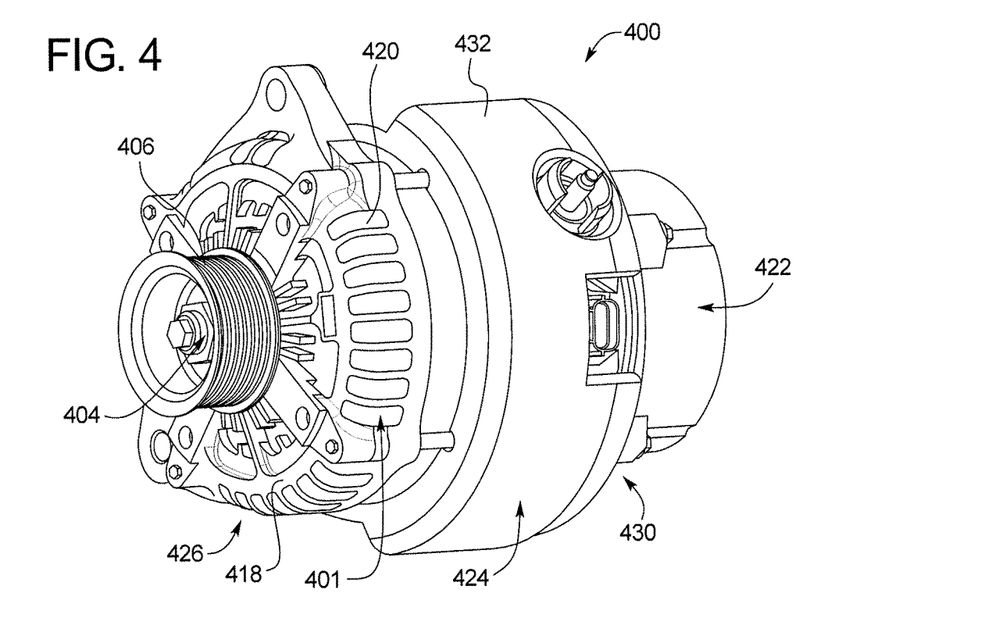
FIG. 4 depicts a front perspective view of another example alternator system comprising an alternator and an external cooling system according to embodiments.
Figure 5:
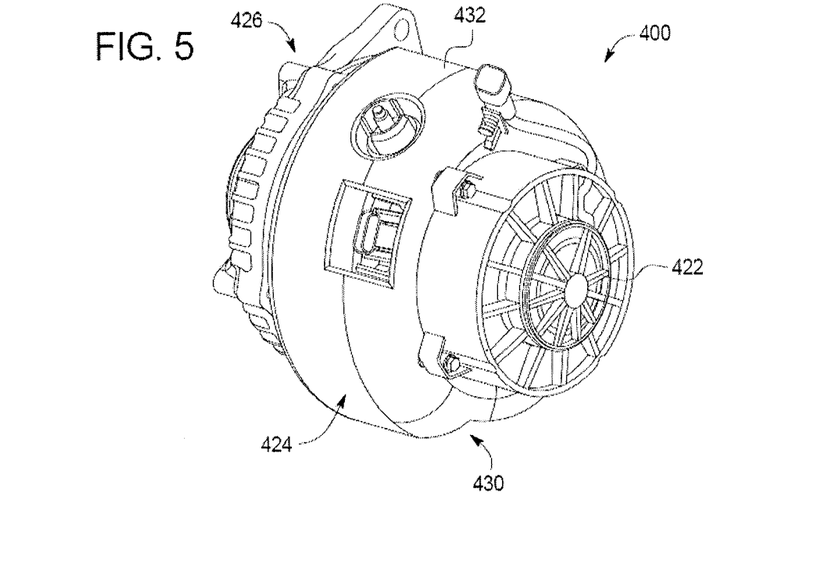
FIG. 5 depicts a rear perspective view of the alternator system shown in FIG. 4, according to embodiments.

Referring now to FIGS. 4 and 5, shown are front and back perspective views of an exemplary alternator assembly 400 comprising an alternator casing 418 and an external cooling system 430, according to embodiments. The alternator casing 418 may be substantially similar, mechanically and operationally, to the alternator casing 318 shown in FIG. 3 and discussed above. Specifically, the alternator casing 418 may include an alternator 401 similar to the alternator 201 shown in FIG. 2, a back end 424, and a plurality of vents 420 for promoting heat dissipation within the alternator. As can be seen in FIG. 4, the alternator casing 418 further includes a front end 426 opposite from the back end 424. The front end 426 includes a drive pulley 406, similar to the drive pulley 206 shown in FIG. 2 and discussed above. A shaft 404, similar to the shaft 204 shown in FIG. 2 and discussed above, extends from the alternator 401 at the front end 424 and axially couples to the drive pulley 406.

According to embodiments, the cooling system 430 includes a duct system 432 and a fan 422, substantially similar to the external fan 322 shown in FIG. 3 and discussed above. As shown in FIGS. 4 and 5, the duct system 432 includes a circular, or generally circular, shroud that at least partially encases the back end 424 of the alternator casing 418. The duct system 432 can be configured to promote airflow around the alternator casing 418 and within the alternator by, for example, providing sufficient space between the casing 418 and the duct system 432.

Figure 6:
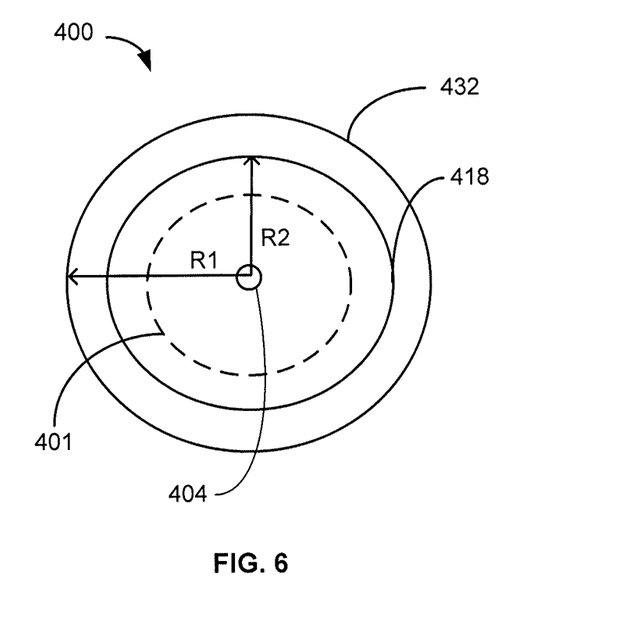
FIG. 6 depicts an exemplary cross-sectional view of the alternator system shown in FIG. 4, according to embodiments.

To illustrate, FIG. 6 depicts an exemplary cross section of the alternator system 400, according to embodiments. For the sake of illustration, the duct system 432, the alternator casing 418, and the alternator 401 are shown as being fully circular components. However, as will be appreciated, in some cases, one or more of these components may be only generally circular. As shown in FIG. 6, a radius R1 of the duct system 432 is greater than a radius R2 of the alternator casing 418. According to embodiments, the magnitude of difference between the radii R1 and R2, and other design elements for the duct system 432 (e.g., length, width, material, etc.) may be determined by a number of factors, including, for example, a size of the alternator 401 and/or alternator casing 418, the type of vehicle and the components therein, the amount of available free space surrounding the alternator casing 418, the power and/or speed of the fan 422, and the like.

Figure 7:
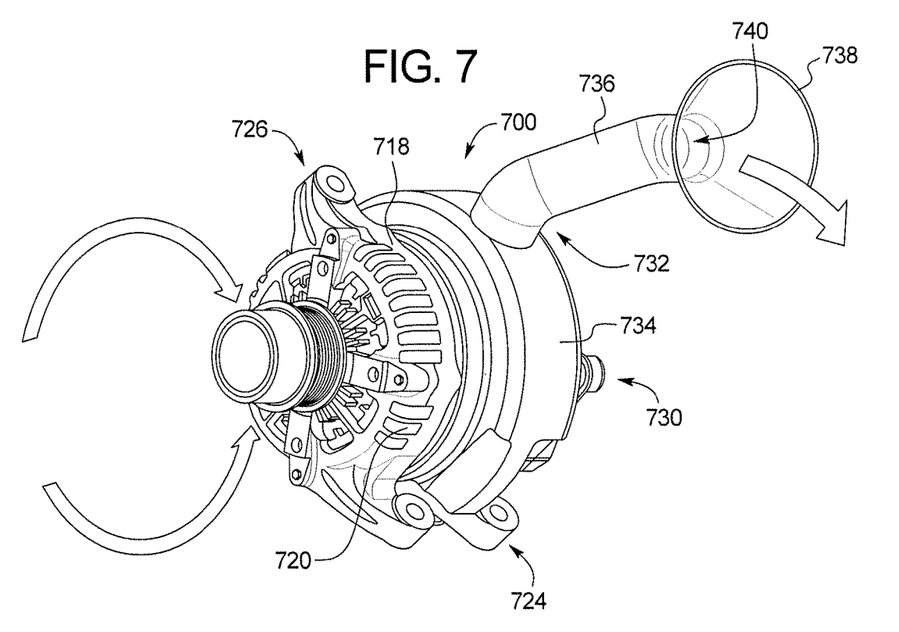
FIGS. 7 and 8 depict exemplary airflow patterns for an example alternator system comprising an alternator and an external cooling system according to embodiments.
Figure 8:
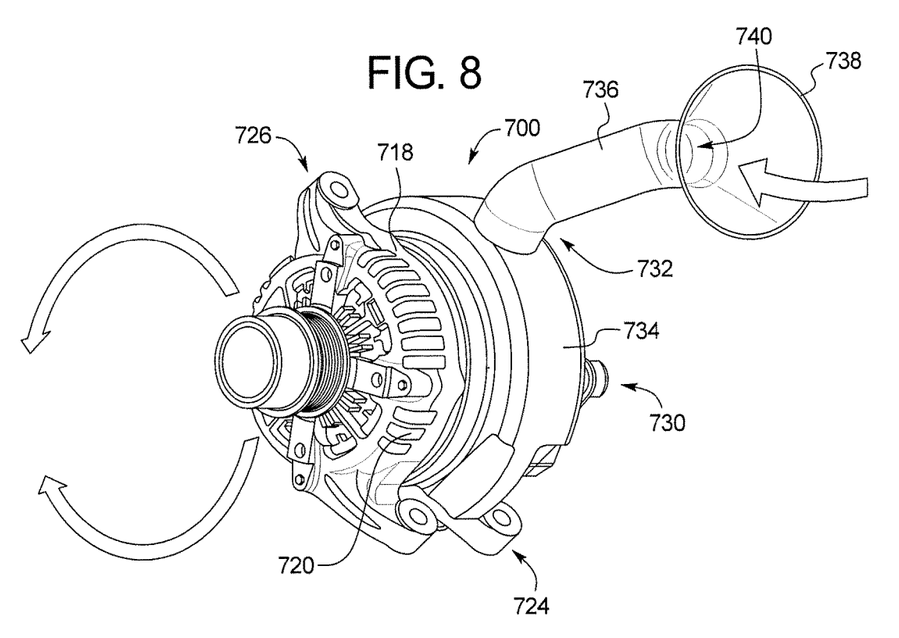

Referring now to FIGS. 7 and 8, shown is an exemplary alternator system 700 comprising an alternator casing 718 and an external cooling system 730, according to embodiments. In embodiments, the alternator casing 718 may be substantially similar to the alternator casing 318 shown in FIG. 3 and discussed above. The cooling system 730 includes a fan (not shown) coupled to a back end 724 of the alternator casing 718, the fan being similar to the external fan 322 shown in FIG. 3 and discussed above. The cooling system 730 further includes a duct system 732 coupled to and surrounding the back end 724 of the alternator casing 718 for improving airflow within the alternator casing 718 and an alternator (not shown) therein. In the depicted embodiment, the duct system 732 comprises a circular main body 734 (also referred to herein as a "shroud" and a "circular duct") and a cylindrical extended portion or arm 736 (also referred to herein as a "cylindrical duct"). In some cases, the duct system 732 further includes a conical outlet 738 coupled to an end 740 of the extended arm 736 that is positioned away from, or opposite of, a front end 726 of the casing 718. According to embodiments, the main body 724 of the duct system 732 can be configured to guide cooling airflow into the alternator casing 718 and around the alternator, as is needed to keep the alternator cool. For example, a radius of the main body 734 may be specifically selected to promote appropriate airflow around the alternator casing 718, as shown in FIG. 6. Likewise, a diameter of the extended arm 736 may be selected to promote airflow through the arm 736 and/or between the main body 734 and the arm 736.

As shown in FIG. 7, in some embodiments, the fan of the cooling system 730 can be configured to pull cool air in through the vents 720 located in the front end 726 of the casing 718 and into the alternator, and then pull warmed air through the back end 724 of the casing 718 and out the extended arm 736 of the duct system 730. As shown in FIG. 8, in other embodiments, the fan of the cooling system 730 can be configured to pull cool air in through the extended arm 736 of the duct system 730 and into the alternator through the back end 724 of the casing 718, and then push warmed air out of the alternator through the front end 726 of the alternator casing 718. As discussed above with respect to the external fan 322 shown in FIG. 3, in some embodiments, the push or pull operation of the fan can be determined by whether the fan is placed rearward facing or forward facing relative to the back end 724 of the casing 718. And in other embodiments, the fan itself may be configured to allow selection of the push or pull operation by including a mechanism for changing a rotational direction of the fan blades.

Figure 9:
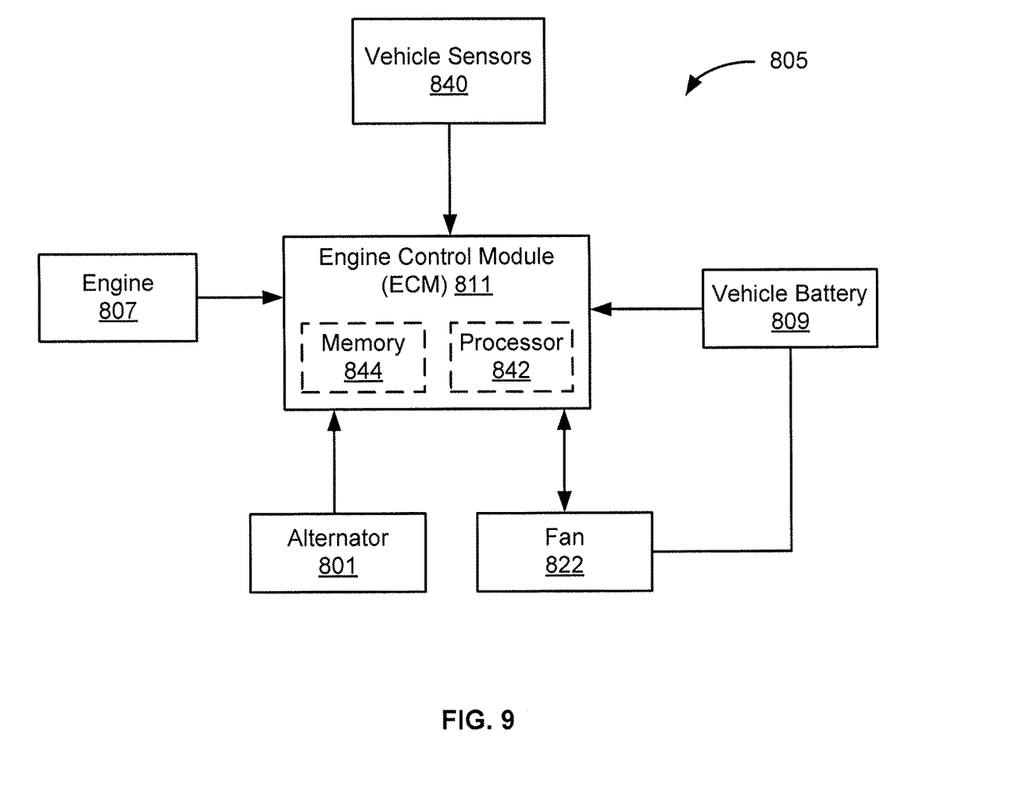
FIG. 9 is a block diagram of an example vehicle comprising an alternator system according to embodiments.

Referring now to FIG. 9, shown is a block diagram representing an exemplary vehicle 805 comprising an alternator 801 similar to the alternator 201 shown in FIG. 2 and discussed above. The vehicle 805 further includes a fan 822 similar to the external fan 322 shown in FIG. 3 and discussed above. In addition, the vehicle 805 includes a vehicle engine 807 that is mechanically coupled to the alternator 801 for driving the alternator 801, as discussed above with respect to FIG. 2. The vehicle 805 further includes a vehicle battery 809 that is electrically coupled to the alternator 801 to receive voltage therefrom. As discussed above, the alternator 801 and the vehicle battery 809 operate in conjunction to generate power for the electrical components of the vehicle 805. In embodiments, the vehicle battery 809 powers the fan 822 and a number of other vehicle components, such as, for example, the interior and exterior lights (not shown) and the instrument panel (not shown).

In addition, the vehicle 805 includes an engine control module (ECM) 811 for controlling operation of the engine 807, and in embodiments, the fan 822. To achieve this task, the ECM 811 receives inputs from a number of vehicle sensors 840 located around the vehicle and uses these inputs to monitor whether the operating conditions of the sensors 840 are within normal operating range. If a problem is detected, the ECM 811 adjusts the operating conditions of the sensors 840 to return the vehicle 805 to normal operation. If the problem cannot be resolved in this manner, the ECM 811 triggers the "check engine light" or the like to notify the vehicle operator of the problem. As an example, the sensors 840 that send data inputs to the ECM 811 may include a coolant temperature sensor. (which monitors the temperature of the engine 807), a voltage regulator (which monitors and adjusts the amount of power being sent throughout the vehicle 805), position sensors (which identify the cycles of the engine 807), an oxygen sensor (which measures exhaust quality), and the like. According to embodiments, the ECM 811 may include a microprocessor, or processor 842, for executing computer programming code stored in a memory 844 of the ECM 811. For example, the computer programming code may determine how the ECM 811 analyzes and reacts to various inputs received from the sensors 840, the engine 807, the alternator 801, the vehicle battery 809, and/or the fan 822.

In embodiments, the ECM 811 is configured to control operation of the fan 822 based on one or more inputs that are related to, or informative of, the operating conditions of the alternator 801. For example, based on the inputs, the ECM 811 may determine whether the fan 822 should be turned on or off, whether the fan speed should be increased or decreased, or that the fan 822 should be maintained at a constant operating speed. In some cases, the one or more inputs include a vehicle operating speed received from the engine 807 or one of the vehicle sensors 840 (e.g., a speed sensor), the vehicle operating speed being directly related to the alternator operating speed. In some cases, the one or more inputs include a temperature of the alternator 801 received from the alternator 801 or one of the vehicle sensors 840 (e.g., a temperature sensor), the alternator temperature indicating whether more or less cooling is needed for the alternator 801. According to embodiments, the ECM 811 can also be configured to determine a present operating speed of the fan 822. As an example, the ECM 811 may determine the fan speed based on current usage information received from the vehicle battery 809. Specifically, the current usage information may include a number of amperes being supplied to the fan 822 by the vehicle battery 809, and the ECM 811 may be configured to calculate fan speed based on the amount of current being supplied to the fan 822.

Based on the one or more received inputs and/or the present fan speed, the ECM 811 may be able to determine a current operating condition of the alternator 822 and/or the engine 807. Further, in embodiments, the ECM 811 can be configured to determine whether a preset condition has been met by the current operating condition based on the one or more inputs. If the condition has been met, the ECM 811 generates a control signal for adjusting an operating speed of the fan 822 accordingly. For example, the preset condition may be met if the alternator temperature exceeds a predetermined temperature threshold and/or if the vehicle operating speed exceeds a predetermined speed threshold. And in response to either determination, the ECM 811 may, for example, increase the fan speed to provide more cooling airflow to the alternator 801.

Figure 10:
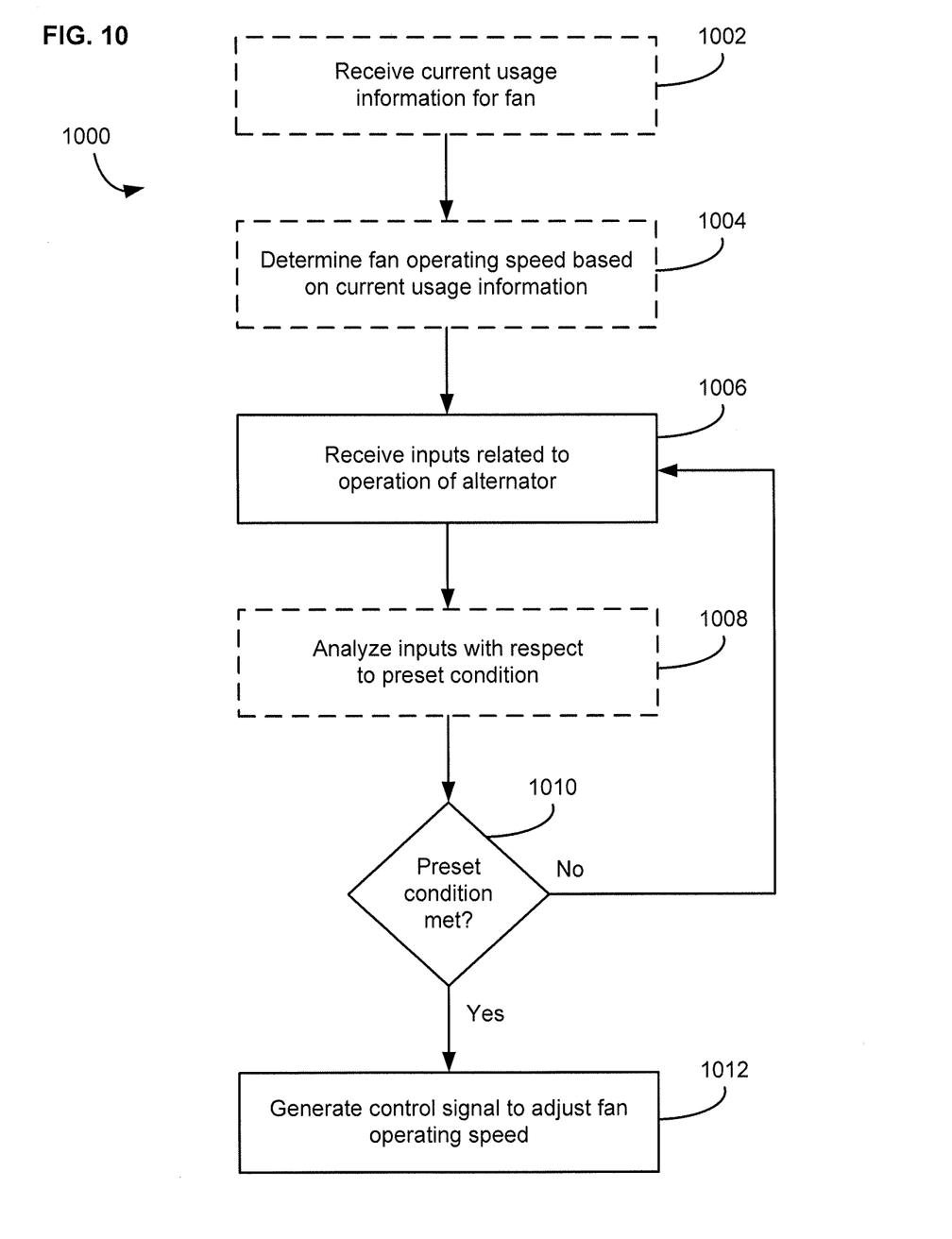
FIG. 10 is a flow diagram of an example method for promoting cooling of an alternator according to embodiments.

Referring now to FIG. 10, shown is a flow diagram of an exemplary method 1000 of controlling cooling of an alternator (such as the alternator 201, 301, and/or 401) by a fan that is operationally independent of the alternator (such as the external fan 322) and a duct system that at least partially surrounds a back end of the alternator (such as the duct system 432), according to embodiments. More specifically, the method 1000 can be utilized to control operation of the independent, external fan in order to promote or improve cooling of the alternator and a casing therefore, such as the alternator casing 318, through the duct system of an alternator assembly. In embodiments, an engine control module (ECM), such as the ECM 811, can implement the method 1000 by executing logic stored in a memory of the ECM, such as the memory 844.

In some embodiments, the method 1000 includes a step 1002 where current usage data is received for the external alternator fan. In such cases, the method 1000 further includes a step 1004, in which a fan operating speed is determined based on the current usage information. The method 900 further includes, at step 1006, receiving an input related to operation of the alternator, such as, for example, a vehicle operating speed or an alternator temperature. In some embodiments, the method 1000 also includes, at step 1008, analyzing the input with respect to a preset condition, for example, by comparing the received input with the preset condition. At step 1010, a determination is made as to whether the preset condition is met. If it has not been met, the method 1000 returns back to step 1006 and waits to receive new inputs. If the preset condition has been met, the method 1000 continues to step 1012, where a control signal is generated to adjust the fan operating speed determined at step 1004. For example, the preset condition may be met if either the vehicle operating speed or the alternator temperature exceeds a given threshold. In embodiments, the control signal may be configured to adjust the fan operating speed by turning the fan on or off, by increasing or decreasing the operating speed, or by maintaining the fan at a constant operating speed. As will be appreciated, if the preset condition is not met, the fan operating speed remains at the level determined in step 1004.

Figure 11:
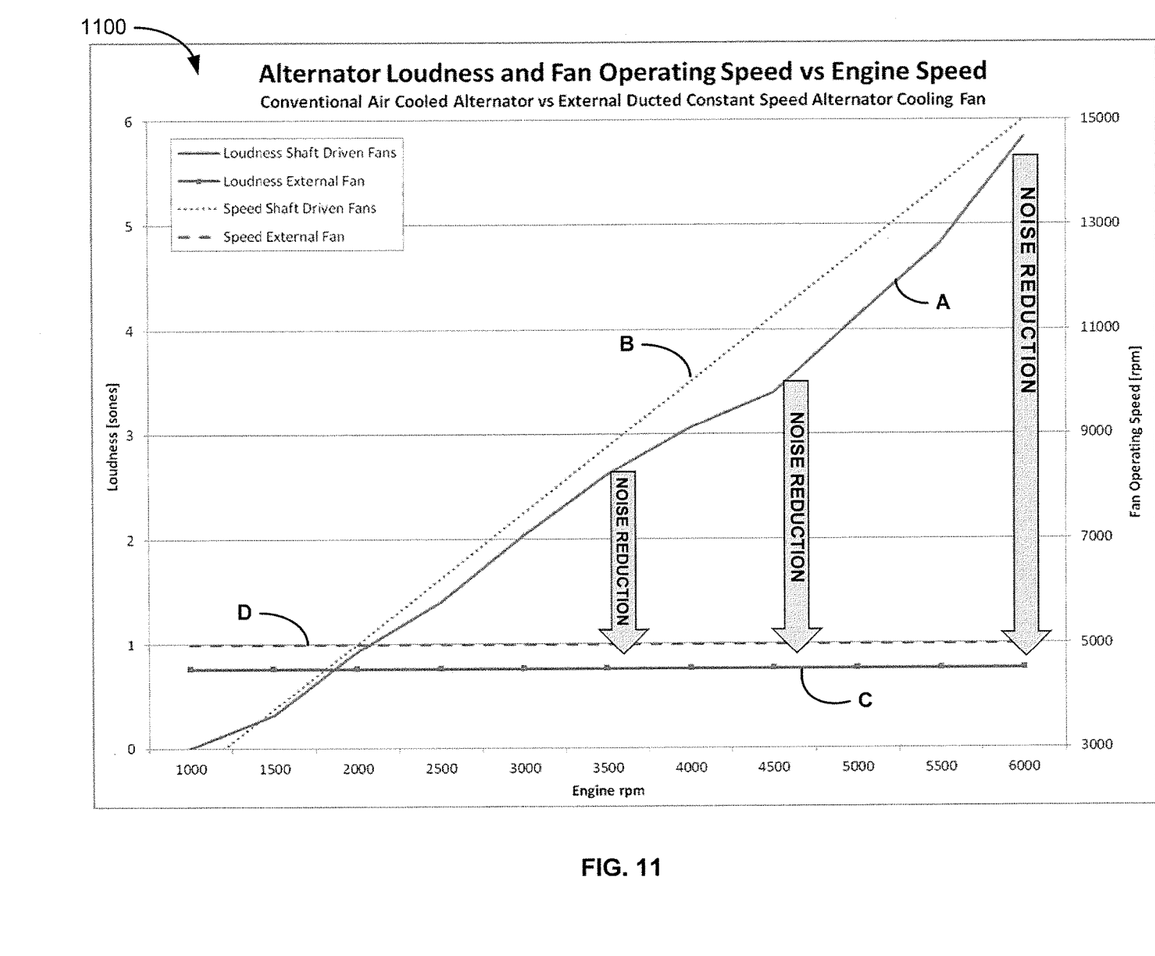
FIG. 11 is a graph showing loudness and fan operating speed as functions of engine speed for a conventional alternator having internal fans and for an alternator with an external ducted constant speed fan, in accordance with embodiments.

Referring now to FIG. 11, shown is a graph 1100 that plots alternator loudness, in sones, and fan operating speed, in rotations per minute (rpm) as a function of engine speed, in rpm, for two different alternator systems. As will be appreciated, 2 sones are twice as loud as 1 sone, 4 sones are twice as loud as 2 sones, etc. The first alternator system includes conventional shaft driven cooling system, such as, for example, fans 112 and 114 shown in FIG. 1. The second alternator system includes an external ducted cooling system, such as, for example, the cooling system 430 comprising the external fan 422 and the duct system 432, as shown in FIGS. 4 and 5. In FIG. 11, curve A shows that alternator loudness steadily increases as a function of engine speed for the first alternator system, and curve B shows that fan operating speed increases linearly as a function of engine speed for the first alternator system. In contrast, curve C shows that alternator loudness remains constant as a function of engine speed for the second alternator system, and curve D shows that operating speed also remains constant as a function of engine speed for the second alternator system.

Studies have shown that in conventional alternators, shaft driven alternator fans operating at above 6000 rpms produce significant radiated noise, as well as excessive airflow that is not necessarily needed to cool the alternator. Due to the noise levels, any electrical benefit from operating at high alternator speeds (e.g., above 6000 rpms) is vastly outweighed by the noise penalty at those same high speeds. Accordingly, in the embodiments described herein, the operating speed of the external fan may be maintained at below 6000 rpm, or for example, at about 5000 rpm, as shown in the graph 1000, for any alternator speed. By keeping the fan operating speed consistently at a preferred level regardless of alternator speed, the alternator loudness can be maintained at an advantageously low level for all engine speeds (such as, for example, below 1 sone as shown in the graph 1100), and at the same time, the alternator can be allowed to operate at very high speeds that enable efficient generation of electrical power, without any NVH penalty. As will be appreciated, the fan operating speed could be maintained at other levels below 6000 rpms depending on a number of factors, including, for example, a size of the alternator and the airflow required thereby.

Thus, in contrast to conventional alternators, which produce excessive noise and high engine speeds, the external ducted cooling system described herein can produce a significant reduction in noise at all engine speeds, including at the highest engine speeds. Moreover, because the alternator speed is dictated by engine speed and pulley ratio, by using a cooling system that is decoupled from, or operates independently of engine speed, as described herein, the alternator can operate at higher speeds to satisfy increasing vehicle electrical loads without a noise (or NVH) penalty.

Any process descriptions or blocks in the figures, such as FIG. 10, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. An alternator assembly, comprising:
   an alternator having a first end and an opposite end; and
   a cooling system to promote airflow between the first end and the opposite end, the cooling system comprising:
   a fan adjacent to the first end and operatively independent of the alternator, and
   a duct system including a circular duct extending circumferentially around the first end and a cylindrical duct protruding outwardly from an outer wall of the circular duct wherein the circular duct is a shroud disposed around the first end, the shroud having a radius that is greater than a radius of the first end, wherein the cylindrical duct is coupled to the circular duct adjacent to the fan and has a first open end opposite from the fan, and wherein the first open end of the cylindrical duct includes a conical opening.

2. The alternator assembly of claim 1, wherein the fan is configured to pull cool air in through a back of the duct system and push the cool air through the alternator.

3. The alternator assembly of claim 1, wherein the fan is configured to pull warm air from the alternator and push the warm air out through a back of the duct system.

4. A vehicle, comprising:
an alternator;
a cooling system comprising:
a fan operationally independent of the alternator and adjacent to an end of the alternator, and
a duct system including a circular duct extending circumferentially around the end of the alternator and a cylindrical duct having a conical opening opposite the fan and protruding outwardly from an outer wall of the circular duct; and
a fan control module responsive to the operation of the alternator.

5. The vehicle of claim 4, further comprising a vehicle battery configured to power the fan.

6. The vehicle of claim 4, wherein the control module controls operation of the fan by maintaining the fan at a constant operating speed.

7. The vehicle of claim 6, wherein the constant operating speed is below 6000 rpm.

8. The vehicle of claim 4, wherein the alternator includes a shaft that is not coupled to any fan of the cooling system.

* * * * *